Sept. 13, 1932.  R. V. SCHROLL  1,877,061
MEASURING METER
Filed April 22, 1931
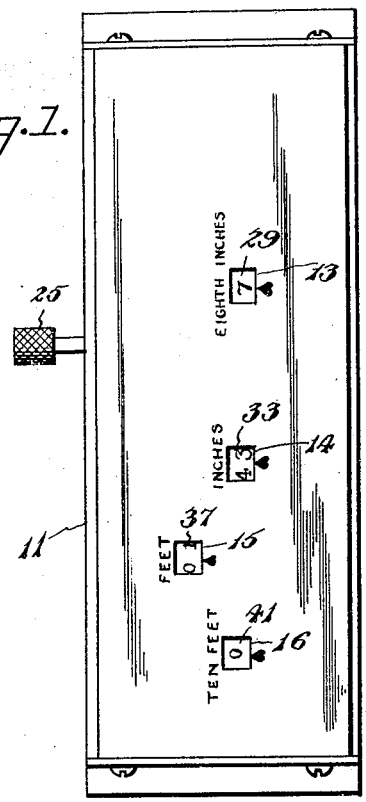
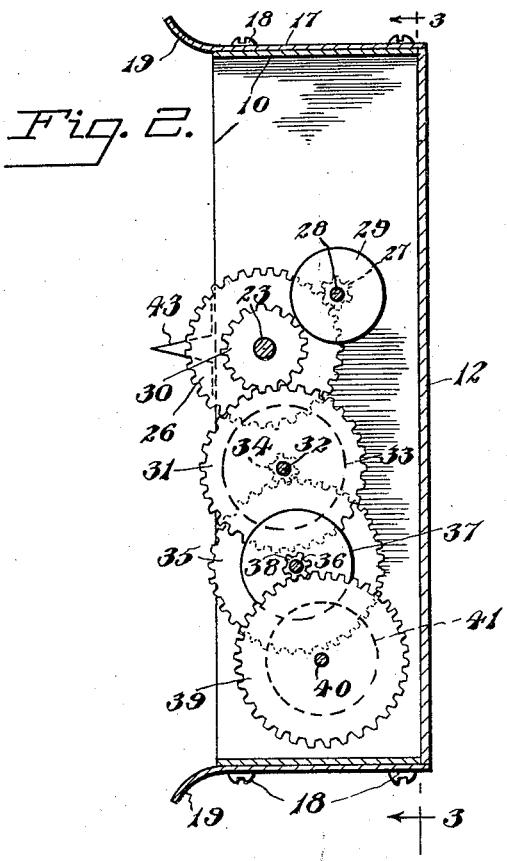
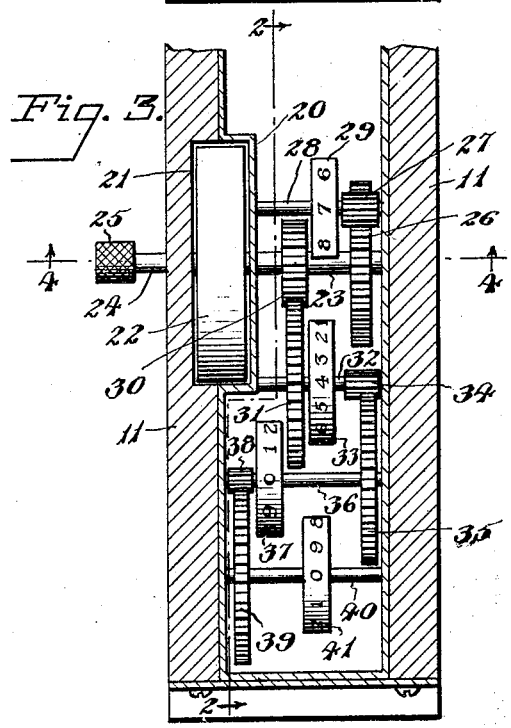
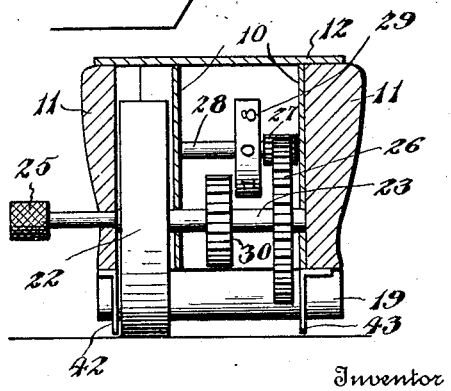
Inventor
R. V. Schroll
By Lacey & Lacey, Attorneys Patented Sept. 13, 1932

1,877,061

UNITED STATES PATENT OFFICE

ROSS V. SCHROLL, OF NORTH MANCHESTER, INDIANA

MEASURING METER

Application filed April 22, 1931. Serial No. 532,036.

This invention relates to measuring meters, especially to that type of meter which employs a gear mechanism turned by a friction wheel which runs on the work to be measured, the gear mechanism operating dials which indicate the measurements between objective points in feet, inches, and fractions thereof.

An object of the present invention is to provide a device of this character which may be easily and conveniently manipulated over round and irregular curved surfaces as well as straight surfaces to measure the same.

A further object of the invention is to provide a device of this type which will have novel lugs at the ends which are spaced apart a specified distance so that measurements may be taken between corners and said specified distance added to the total reading to give the correct measurement between corners.

A still further object is to provide a device of this character having pointers at the bottom of the casing, with their tips located in the central transverse plane of the friction wheel, one of these pointers designating the bottom center of the friction wheel, and the other being used to indicate the points between which the measurement is taken by being placed directly over the initial or starting point at the beginning of the measuring operation, whereupon the device is run in a direct line along the work until the pointer reaches the terminal objective point of the length of material to be measured.

A still further object of the invention is to provide a small, light and compact device of this character which may be easily and quickly manipulated to give measurements with extreme rapidity, and which will be formed of a few simple, durable and inexpensive parts that will not easily get out of order.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of a measuring meter constructed in accordance with my invention, Fig. 2 is a longitudinal sectional view through the meter, taken on the line 2—2 of Fig. 3, Fig. 3 is a cross sectional view through the measuring meter taken on the line 3—3 of Fig. 2, and Fig. 4 is a cross sectional view through the measuring meter taken on the line 4—4 of Fig. 3.

Referring now to the drawing in which like characters of reference designate similar parts in the various views, 10 designates a casing which is preferably formed of metal and is substantally rectangular in longitudinal section and in cross section. The side walls of the casing are preferably faced with wood strips 11, best shown in Figs. 3 and 4, to provide a comfortable grip for manipulating the casing manually. The casing is closed at the top by means of a metal cover plate 12 which is provided, as best shown in Fig. 1, with preferably four sight openings 13, 14, 15, and 16. A pair of end plates 17 is secured by screws 18 to the end walls of the casing, and these plates project at the bottom beyond the bottom edge of the casing and are curved outwardly therefrom to provide lugs 19 which, as best shown in Fig. 4, extend to the side edges of the casing. The tips of these lugs are spaced a specified distance apart, preferably exactly six inches, and, as hereinafter will be described, are used when distances between corners are to be measured.

By now referring to Figs. 3 and 4, it will be seen that a medial portion of one of the side walls of the casing is offset inwardly to provide a housing 20, and, likewise, the contiguous wood strip 11 is cut away to provide a housing 21 which coacts with the housing 20 in receiving a friction wheel 22. The friction wheel is fixed to a shaft 23, the ends of which are journaled in the side walls of the casing, and one of the ends is extended outwardly beyond the corresponding side wall, as shown at 24, and terminally equipped with a knurled knob 25 by means of which the shaft may be rotated to reset the hereinafter described dials to zero after each measuring operation. The surface of the wheel projects below the bottom edges of the casing and the lugs 19, as best shown in Fig. 4, and rides upon the surface to be measured, thereby turning the shaft 23 correspondingly. The circumference of the friction wheel is preferably made exactly six inches in length.

The friction wheel 22 directly drives a gear 26 fixed to the shaft 23, which gear in turn drives a pinion 27 fixed to a shaft 28, the ends of which are journaled in the side walls of the casing and upon which is fixed a dial 29, the peripheral edge of which is provided with indicating numerals reading from zero to 7. The gear drives the pinion 27 at the ratio of 1 to 6, that is, the pinion turns six times for each turn of the gear. Therefore, the dial 29, which is divided into eight equal parts and numbered 0 to 7, measures inches in eighths, as indicated in Fig. 1, since 1 inch advance of the wheel 22, that is, one-sixth turn of the wheel 22, turns the dial one complete turn or one inch.

The friction drive wheel 22 also directly drives a pinion 30 which is fixed to the shaft 23. This pinion drives a gear 31 fixed to a shaft 32, the ends of which are journaled in the side walls of the casing, and which carries a dial 33 bearing on its peripheral edge indicating numerals from 0 to 11. The pinion 30 turns the gear 31 at a ratio of 2 to 1, that is, for each two turns of the pinion the gear 31 will be turned once, and, since the friction wheel meshes circumferentially exactly six inches, two turns of the pinion 30 will be equivalent to a travel of twelve inches of the wheel, and, consequently, the single turn of the gear 31 is equivalent to a travel of twelve inches, and, hence, the designating numerals on the dial 33 indicate inch fractions of one foot, as best shown in Fig. 1.

The shaft 32 is provided with a pinion 34 which meshes with a gear 35 carried by a shaft 36, the ends of which are journaled in the side walls of the casing, and which shaft is equipped with a dial 37 bearing on its circumferential edge indicating numerals from 0 to 9. The pinion 34 turns the gear 35 at the ratio of 10 to 1, that is, ten turns of the pinion will cause one complete turn of the gear. Therefore, the dial 37 is divided into ten equal parts and numbered from 0 to 9, as above stated, and makes one complete revolution during each ten revolutions of the inch indicating dial 33, hence, indicates measurements in feet up to ten feet, as indicated in Fig. 1.

A pinion 38, fixed to the shaft 36, directly drives a gear 39 carried by a shaft 40, the ends of which are journaled in the side walls of the casing, and which carries a dial 41 bearing on its circumferential edge indicating numerals from 0 to 9. The pinion 38 bears a ratio of 10 to 1 to the gear 39, so that during each ten turns of the pinion the gear 39 will be rotated through one complete revolution, and, consequently, a complete revolution of the dial 41 will represent 100 feet, and the fractional parts thereof will indicate feet in multiples of ten, as shown in Fig. 1.

As above stated, the two downwardly extending terminal flanges or spurs 19 permit of measurements being taken from corner to corner. Since the tips of the spurs are located six inches apart preferably, it will be seen that if measuring corner to corner, one spur is placed at the corner, and the device is thereupon run over the surface to be measured until the opposite spur strikes the objective corner, six inches must be added to the reading disclosed on the dials through the sight openings 13 to 16, inclusive, to obtain the exact measurement between the corners.

It will be further observed that a pair of metal indicating pointers 42 and 43, best shown in Figs. 2 and 4, are secured to the underneath edges of the wood facing strips 11 of the casing at the central cross plane of the friction drive wheel 22. The purpose of the pointers 42 and 43 is to locate the meter directly over the initial point from which the measurement is to be taken by placing one or the other of these pointers at said initial point.

Thereupon, the casing is manually pushed in a direction line to the objective point and, when either of the indicating pointers 42 or 43 is directly over said objective point, the meter may be raised for reading.

It is essential that before starting to measure any straight or irregular surface that all of the dials be set to display the zero thereof through the sight openings. For setting the dial, the knurled knob 25 is turned in a retrograde direction until all of the zeroes are presented at the sight openings.

In reading the meter, it will be pointed out that it is essential that only the smaller number be read if there are two numbers on any dial facing directly upward. For example, if the dial representing inches, indicated at 33 in Fig. 1, stands with the numerals 3 and 4 upward, and the dial representing one-eighth inches, indicated at 29 in Fig. 1, stands to present the numeral 7 upward, the reading is three and seven-eighths inches.

From the above description, the construction and operation of the invention will be fully understood without further explanation.

Having thus described the invention, I claim:

1. A measuring meter comprising an elongated open bottom casing having sight openings in the top, terminal flanges on the ends of the bottom of the casing directed outwardly at the bottom to engage corners between which measurement is to be taken and disposed a predetermined distance apart, a friction wheel in the casing projecting through the bottom of the casing between the flanges adapted to be rotated by travel upon the work to be measured, and dials carried by the casing geared to the friction wheel and exposed through said sight openings for indicating travel of the wheel, said predetermined distance between the flanges being added to the reading of the dials to compute total distance between corners.

2. A measuring meter comprising an open bottom casing of substantially rectangular longitudinal and cross section, grips on the longitudinal sides of the casing being offset, one side of the casing and the corresponding face of the adjacent grip being recessed to provide a housing, a friction wheel rotatably mounted in the housing and projecting through the open bottom of the casing to be rotated by travel upon the work to be measured, dials carried by the casing and geared to the friction wheel for indicating travel of the wheel, and a cover plate between the grips forming a top for the casing having sight openings exposing the dials.

3. A measuring meter comprising a casing, strips on the longitudinal sides of the casing forming grips, there being sight openings in the top of the casing between the grips, a friction wheel in the casing adapted to be rotated by travel upon the work to be measured, pointers disposed on the lower edge of the casing with their tips in the central transverse plane of the friction wheel and adapted to be placed over the starting point and objective point of the portion of a straight or irregular surface to be traveled by the friction wheel, and dials in the casing geared to the friction wheel and exposed through said sight openings for indicating travel of the friction wheel.

4. A measuring meter comprising a casing, terminal flanges on the ends of the casing projecting below the bottom of the casing and directed outwardly at the ends to engage corners between which measurement is to be made, a friction wheel rotatably mounted in the casing and projecting below the casing to be rotated by travel upon the work to be measured, and dials carried by the casing geared to the friction wheel for indicating travel of the wheel.

In testimony whereof I affix my signature.

ROSS V. SCHROLL. [L. S.]